United States Patent
Arashi

(10) Patent No.: US 9,891,419 B2
(45) Date of Patent: Feb. 13, 2018

(54) MICROSCOPE ILLUMINATION APPARATUS

(71) Applicant: OLYMPUS CORPORATION, Shibuya-ku, Tokyo (JP)

(72) Inventor: Bunryu Arashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 88 days.

(21) Appl. No.: 15/001,790

(22) Filed: Jan. 20, 2016

(65) Prior Publication Data

US 2016/0216500 A1    Jul. 28, 2016

(30) Foreign Application Priority Data

Jan. 26, 2015 (JP) .................. 2015-012577

(51) Int. Cl.
| | |
|---|---|
| G02B 21/10 | (2006.01) |
| G02B 21/24 | (2006.01) |
| G02B 21/02 | (2006.01) |
| G02B 21/14 | (2006.01) |

(52) U.S. Cl.
CPC ............. *G02B 21/10* (2013.01); *G02B 21/02* (2013.01); *G02B 21/14* (2013.01); *G02B 21/248* (2013.01)

(58) Field of Classification Search
CPC ...... G02B 21/10; G02B 21/14; G02B 21/248; G02B 21/02
USPC .......................... 359/370, 385, 387, 388, 390
See application file for complete search history.

(56) References Cited

U.S. PATENT DOCUMENTS

| | | | | |
|---|---|---|---|---|
| 4,687,304 A | * | 8/1987 | Piller .................. | G02B 21/125 359/387 |
| 5,038,258 A | * | 8/1991 | Koch .................... | G01B 11/00 359/656 |
| 7,273,298 B2 | * | 9/2007 | Laschke ................ | G02B 21/06 340/584 |
| 7,440,184 B2 | * | 10/2008 | Takeuchi .............. | G02B 21/16 359/368 |
| 2001/0043336 A1 | * | 11/2001 | Shitamich ............. | G01S 17/08 356/614 |
| 2005/0243414 A1 | * | 11/2005 | Masuyama ........... | G02B 21/06 359/387 |
| 2007/0236785 A1 | * | 10/2007 | Matsumoto .......... | G02B 21/125 359/381 |
| 2010/0085635 A1 | * | 4/2010 | Verboven .............. | G01N 21/87 359/382 |
| 2011/0013275 A1 | * | 1/2011 | Hein .................... | G02B 21/082 359/388 |

(Continued)

FOREIGN PATENT DOCUMENTS

| | | | |
|---|---|---|---|
| JP | 2005227442 A | | 8/2005 |
| JP | 2007093887 A | * | 4/2007 |

*Primary Examiner* — Frank Font
(74) *Attorney, Agent, or Firm* — Holtz, Holtz & Volek PC

(57) ABSTRACT

A microscope illumination apparatus includes: a dark-field illumination unit including a light source that is arrangeable in an outer periphery of an observation light path of a microscope, the dark-field illumination unit being removably provided in the outer periphery of the observation light path; a detector that detects that the dark-field illumination unit has been arranged in a prescribed position of the outer periphery of the observation light path, and outputs a turn-on signal; and a controller that controls the light source to be turned on in accordance with the detection of the detector.

11 Claims, 19 Drawing Sheets

(56) References Cited

U.S. PATENT DOCUMENTS

| | | | |
|---|---|---|---|
| 2012/0044340 A1* | 2/2012 | Yamamoto | G02B 21/14 348/79 |
| 2013/0077159 A1* | 3/2013 | Tani | G02B 21/125 359/387 |
| 2013/0141730 A1* | 6/2013 | Quintanilha | G02B 6/10 356/446 |
| 2014/0354796 A1* | 12/2014 | Hein | G02B 21/086 348/79 |
| 2015/0022883 A1* | 1/2015 | Staples | G02B 21/084 359/387 |

* cited by examiner

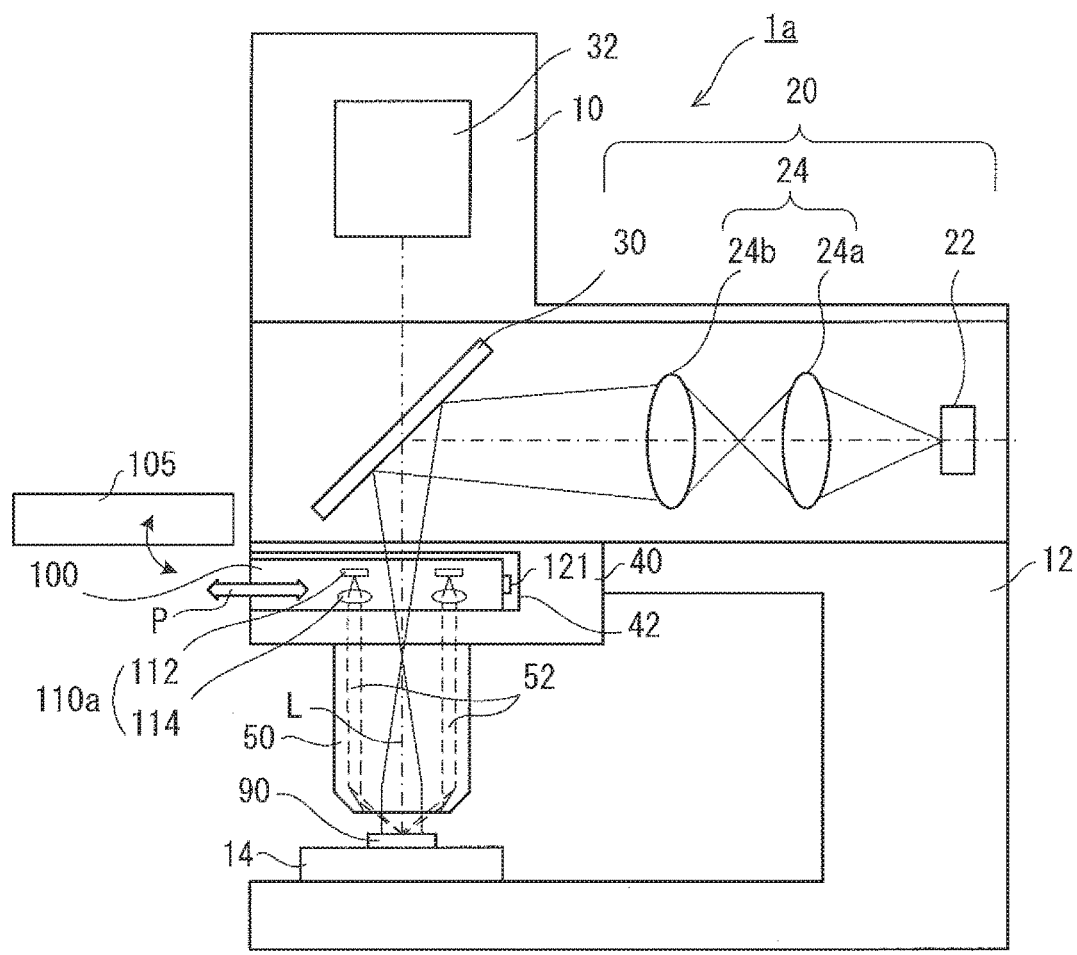
F I G. 1

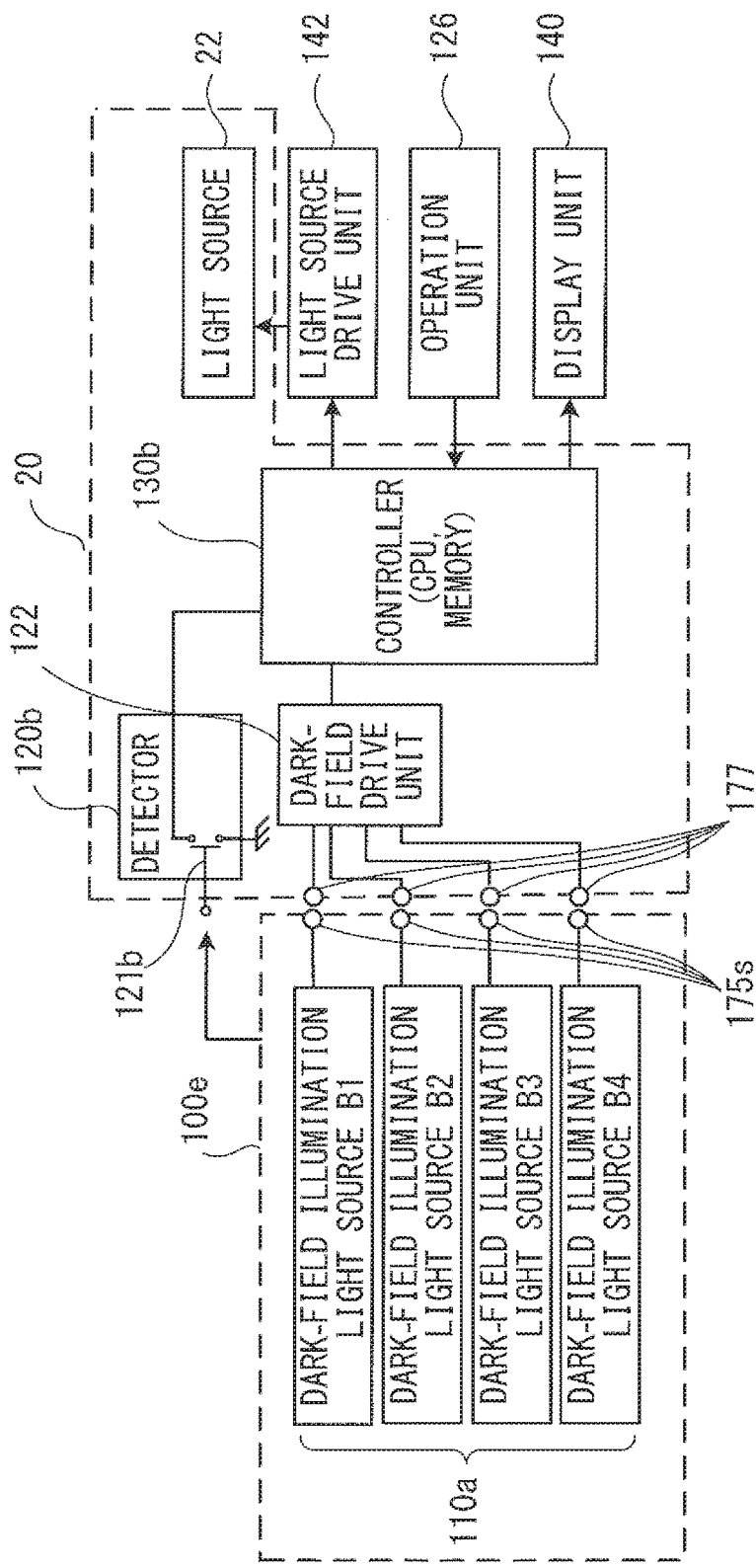
F I G. 9

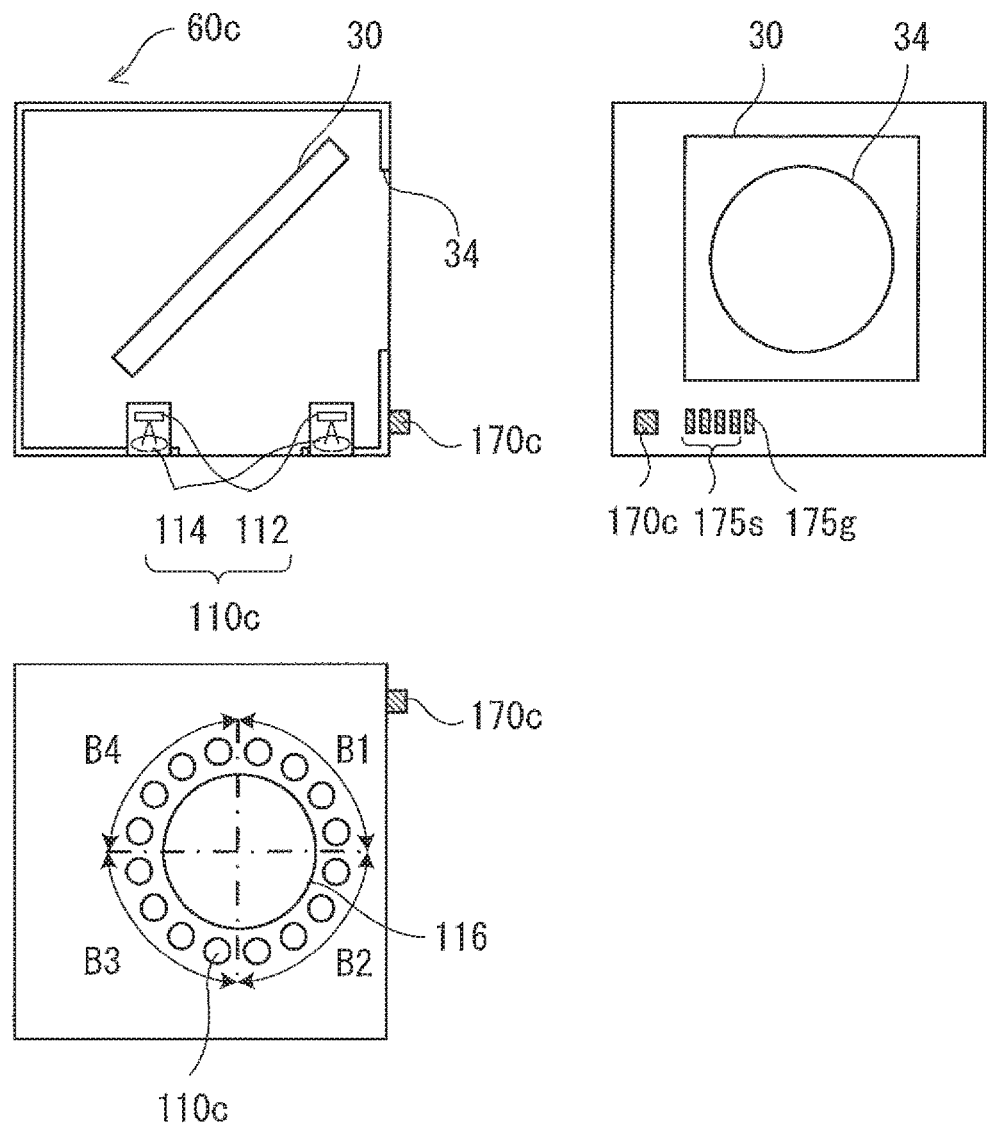
F I G. 11

MICROSCOPE ILLUMINATION APPARATUS

CROSS-REFERENCE TO RELATED APPLICATIONS

This application is based upon and claims the benefit of priority of the prior Japanese Patent Application No. 2015-12577, filed on Jan. 26, 2015, the entire contents of which are incorporated herein by reference.

BACKGROUND OF THE INVENTION

Field of the Invention

The present invention relates to a microscope illumination apparatus, and in particular to a technology for dark-field illumination of a microscope.

Description of the Related Art

A microscope illumination apparatus is known that includes both a bright-field illumination optical system that condenses light emitted from a light source in an exit pupil position of an objective and a dark-field illumination optical system that irradiates a sample with illumination light from a ring-shaped light source from an oblique direction so as to obtain scattered light or diffracted light. Further, a microscope apparatus in which a dark-field illumination unit including a light source and a lens, the dark-field illumination unit being a portion of a dark-field illumination optical system, is removable from a microscope body is proposed in Patent Document 1 (Japanese Laid-open Patent Publication No. 2005-227442).

By configuring a dark-field illumination unit so as to be a removable unit, as disclosed in Patent Document 1, a microscope apparatus can be utilized with the dark-field illumination unit equipped as needed so as to switch an illumination mode to dark-field illumination.

SUMMARY OF THE INVENTION

A microscope illumination apparatus according to one aspect includes: a dark-field illumination unit including a light source that is arrangeable in an outer periphery of an observation light path of a microscope, the dark-field illumination unit being removably provided in the outer periphery of the observation light path; a detector that detects that the dark-field illumination unit has been arranged in a prescribed position of the outer periphery of the observation light path so as to output a turn-on signal, or that detects that the dark-field illumination unit has deviated from the prescribed position of the outer periphery of the observation light path so as to output a turn-off signal; and a controller that controls the light source to be turned on or off in accordance with an output of the detector.

In a microscope illumination apparatus according to another aspect, the dark-field illumination unit is provided in a slider that is inserted into or removed from a revolver of the microscope, in order to arrange a prescribed optical element in the observation light path, and the detector detects that the slider has been arranged in or deviated from a prescribed position of the revolver.

In a microscope illumination apparatus according to another aspect, the dark-field illumination unit is provided in a mirror unit mounted onto an illumination apparatus of the microscope, and the detector detects that the mirror unit has been arranged in or deviated from a prescribed position of the observation light path.

In a microscope illumination apparatus according to another aspect, the dark-field illumination unit is provided within a revolver in at least one mounting unit of a plurality of mounting units for mounting an objective, the plurality of mounting units being provided in the revolver, and the detector detects on the basis of a rotation position of the revolver that the at least one mounting unit has been arranged in or deviated from a prescribed position of the observation light path, the at least one mounting unit being provided with the dark-field illumination unit.

In a microscope illumination apparatus according to another aspect, the dark-field illumination unit is provided in an objective, and the detector detects that the objective has been mounted onto a prescribed mounting unit of a revolver for mounting the objective, the objective being provided with the dark-field illumination unit.

In a microscope illumination apparatus according to another aspect, the slider includes an optical element for differential interference observation, in addition to the dark-field illumination unit.

In a microscope illumination apparatus according to another aspect, the light source is a semiconductor element. In a microscope illumination apparatus according to another aspect, the light source is a fluorescent tube. In a microscope illumination apparatus according to another aspect, the controller performs control to change colors of the light source.

In a microscope illumination apparatus according to another aspect, a plurality of the light sources are arranged in a ring shape, the plurality of the light sources are divided into a prescribed number of blocks in a circumferential direction, and the controller controls a direction of oblique illumination by turning on a specified block of the prescribed number of blocks. In a microscope illumination apparatus according to another aspect, the controller controls the light sources to be turned on in block units.

In a microscope illumination apparatus according to another aspect, the controller controls the light sources to be turned on in block units in an arbitrary order, specifying the blocks in the circumferential direction.

A microscope illumination apparatus according to another aspect includes a display unit to display respective illumination states.

In a microscope apparatus in which a dark-field illumination unit is configured so as to be a removable unit, it is preferable that a light source of the dark-field illumination unit be appropriately controlled, for example, to be turned on or off in accordance with the arrangement of the dark-field illumination unit in an outer periphery of an observation light path. According to the microscope illumination apparatus described above, a microscope illumination apparatus can be provided that performs control according to the arrangement of a dark-field illumination unit in an outer periphery of an observation light path.

BRIEF DESCRIPTION OF THE DRAWINGS

FIG. 1 illustrates an entire configuration of a microscope apparatus 1 according to a first embodiment.

FIG. 9 is a control block diagram in the fourth example of the first embodiment.

FIG. 11 is a trihedral figure illustrating a configuration of an optical path return unit according to the second embodiment.

DETAILED DESCRIPTION OF THE PREFERRED EMBODIMENTS

Figure 2A:
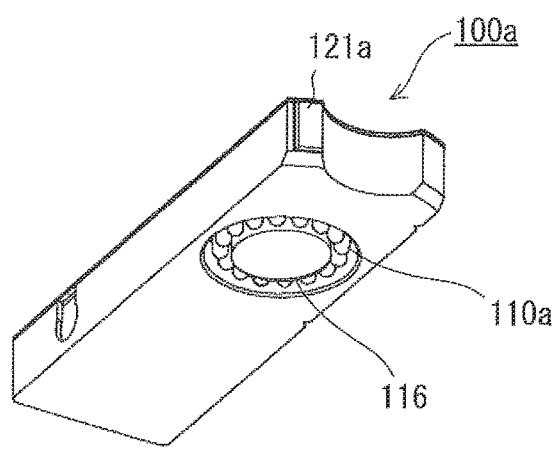
FIG. 2A is an outline view of a slider in a first example of the first embodiment viewed obliquely from below.

Embodiments of the present invention are described below with reference of the drawings. Microscope illumination apparatuses according to first to fourth embodiments of the present invention are sequentially described below.

First Embodiment

FIG. 1 is a sectional view of a microscope apparatus 1a equipped with a microscope illumination apparatus according to a first embodiment illustrating a cross section including an observation optical axis L, and illustrates an entire configuration of the microscope apparatus 1a. The first embodiment is an example in which a dark-field illumination unit is included in a slider that is removably provided in the microscope apparatus 1a.

The microscope apparatus 1a includes a lens barrel 10 of a microscope for observation of a sample 90, an L-shaped body unit 12, and a stage 14 on which the sample 90 is placed.

The lens barrel 10 includes an observation unit 32, and the observation unit 32 includes a tube lens, an eyepiece, or an imaging device such as a CCD camera, although these are not illustrated. The body unit 12 is configured in such a way that the lens barrel 10, an illumination apparatus 20, a revolver 40, and the like can be mounted. The illumination apparatus 20 includes a light source 22, a bright-field illumination optical system 24, and a half mirror 30. The revolver 40 supports a plurality of objectives, and selectively switches a prescribed objective 50 on an observation light path.

The light source 22 is configured of a halogen lamp, a xenon lamp, a mercury lamp, or the like. The bright-field illumination optical system 24 makes light from the light source 22 form an image in a brightness diaphragm (AS) position by using a convex lens 24a and a convex lens 24b. When the light source 22 is a primary light source, the formed image is used for a secondary light source so as to form a light source image again in an exit pupil position of the objective 50.

The half mirror 30 reflects bright-field illumination light toward the sample 90 in a 90° downward direction. The bright-field illumination light reflected by the half mirror 30 is applied from the objective 50 on the observation optical axis L to the sample 90. The half mirror 30 transmits the reflected light from the sample 90, and guides the reflected light to the observation unit 32. The observation unit 32 includes a tube lens, and an eyepiece or an image sensor (not illustrated), and forms an optical image that has passed through the half mirror 30.

In the revolver 40, a slider mounting unit 42 is formed that houses a slider that adds an optional function to a microscope.

A slider mounted in FIG. 1 is a slider 100 including a dark-field illumination unit. An arrow P represents a direction in which the slider is inserted or removed. A user can draw out the slider 100 in a leftward direction of the arrow P, remove the slider 100, and exchange the slider 100 with another slider. Examples of a slider other than the slider 100 include a slider 105 provided with a specific optical element. Differential interference observation can be performed by mounting a slider 105 provided with, for example, a differential interference element.

In the slider 100, a dark-field illumination unit 110a is provided that is formed of a dark-field illumination light source 112 and a collimator lens 114. The dark-field illumination light source 112 is a semiconductor light emitter that performs surface emission, such as an LED. It is preferable that the dark-field illumination light source 112 and the collimator lens 114 be integrally formed. The collimator lens 114 converts dark-field illumination light from the dark-field illumination light source 112 into almost parallel light, and applies the almost parallel light to the side of the objective 50. The dark-field illumination unit 110a is configured in such a way that a plurality of sets of the dark-field illumination light source 112 and the collimator lens 114 are arranged.

The collimator lens 114 has been described above as an example; however, dark-field illumination light does not need to be exactly converted into parallel light, and a condenser lens may be used that can make a large quantity of dark-field illumination light from the dark-field illumination light source 112 incident to a dark-field illumination light path 52.

The objective 50 is incorporated with a plurality of lenses (not illustrated), and includes the dark-field illumination light path 52 that transmits the dark-field illumination light emitted from the collimator lens 114, in an outer periphery of the observation light path. The dark-field illumination light path 52 is provided in a ring shape in the outer periphery of the observation light path with the observation optical axis L as a center. An end on the side of a sample of the dark-field illumination light path 52 is a reflecting mirror having a prescribed angle so as to bend the dark-field illumination light in the optical axis direction. A configuration can be employed in which the dark-field illumination light is similarly condensed in the observation optical axis L by providing an optical element such as a lens having a positive refractive index with a center hollowed out so as to form a doughnut shape, or both the optical element and the above reflecting mirror near the end on the side of the sample. A central portion including an optical axis of the objective 50 forms the observation light path, and an observed image of the illuminated sample 90 passes through the observation light path toward the observation unit 32.

Figure 2B:
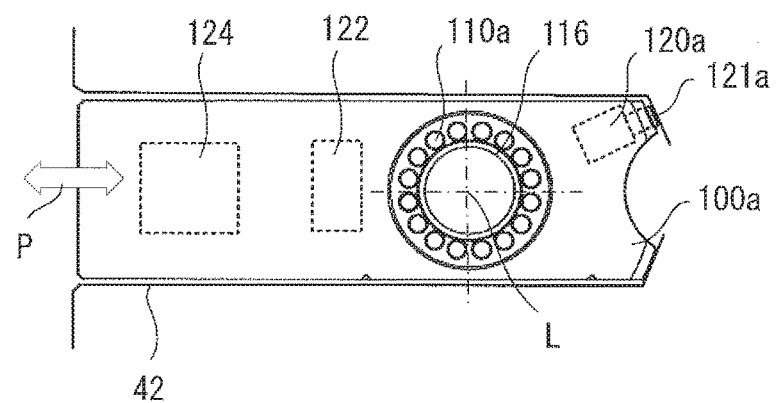
FIG. 2B is an outline view of a slider in the first example of the first embodiment viewed from a sample side.

FIGS. 2A and 2B are outline views of the slider 100 in a first example of the first embodiment. The slider 100 in the first example is referred to as a slider 100a. FIG. 2A is a perspective view of the slider 100a viewed obliquely from below. FIG. 2B illustrates the slider 100a mounted onto the revolver 40 viewed from the side of the sample 90. The dark-field illumination unit 110a is configured in such a way that sets of the dark-field illumination light source 112 and the collimator lens 114 are arranged in a ring shape in an outer periphery of the observation light path with the observation optical axis L as a center. In a central portion of the dark-field illumination unit 110a through which the observation optical axis L passes, an aperture 116 is formed that configures the observation light path.

In a central portion of the end of the slider 100a in a direction in which the slider 100a is mounted (a rightward direction of the arrow P), an arc-shaped concave portion is formed. On a side of the end of the slider 100a, a movable piece 121a is provided that detects insertion or removal of the slider 100a.

As illustrated in FIG. 2B, the slider 100a incorporates a detector 120a, a dark-field drive unit 122, and a power source 124. The power source 124 may be, for example, a rechargeable battery. The detector 120a detects that the slider 100a has been mounted onto the slider mounting unit 42 of the revolver 40. Examples of the detector 120a include a microswitch. The movable piece 121a is a section for detection that is mounted onto the detector 120a.

The dark-field drive unit 122 is a driver circuit that turns on the dark-field illumination light sources 112. When the dark-field illumination light source 112 is an LED, the dark-field drive unit 122 is an LED driver. When the detector 120a detects that the slider 100a has been mounted in a prescribed position of the slider mounting unit 42, and outputs a turn-on signal, the dark-field drive unit 122 supplies a prescribed current to the dark-field illumination light sources 112. When the detector 120a detects that the slider 100a has deviated from a prescribed position of the slider mounting unit 42, and outputs a turn-off signal, the dark-field drive unit 122 stops the dark-field illumination light sources 112. The power source 124 supplies a current to the dark-field illumination light sources 112.

Figure 3:
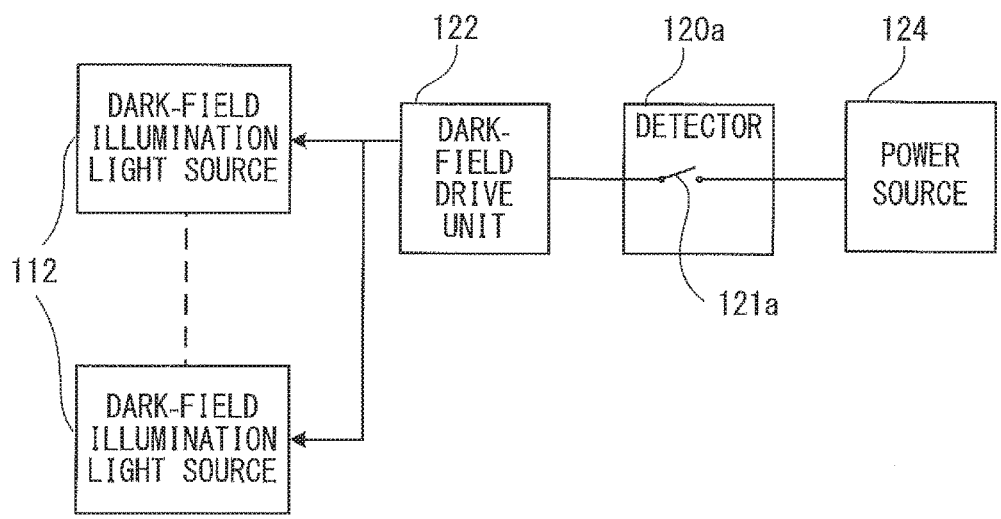
FIG. 3 is a control block diagram of a dark-field illumination unit in the first example of the first embodiment.

FIG. 3 is a control block diagram of the dark-field illumination unit 110a. FIG. 3 illustrates the detector 120a, the dark-field drive unit 122, and the power source 124 described above in the form of an electric circuit. The detector 120a controls energization to the dark-field illumination light sources 112 so as to turn on or off the dark-field illumination light sources 112, and the plural dark-field illumination light sources 112 are collectively driven by the dark-field drive unit 122. In this example, the detector 120a also functions as a controller.

Figure 4:
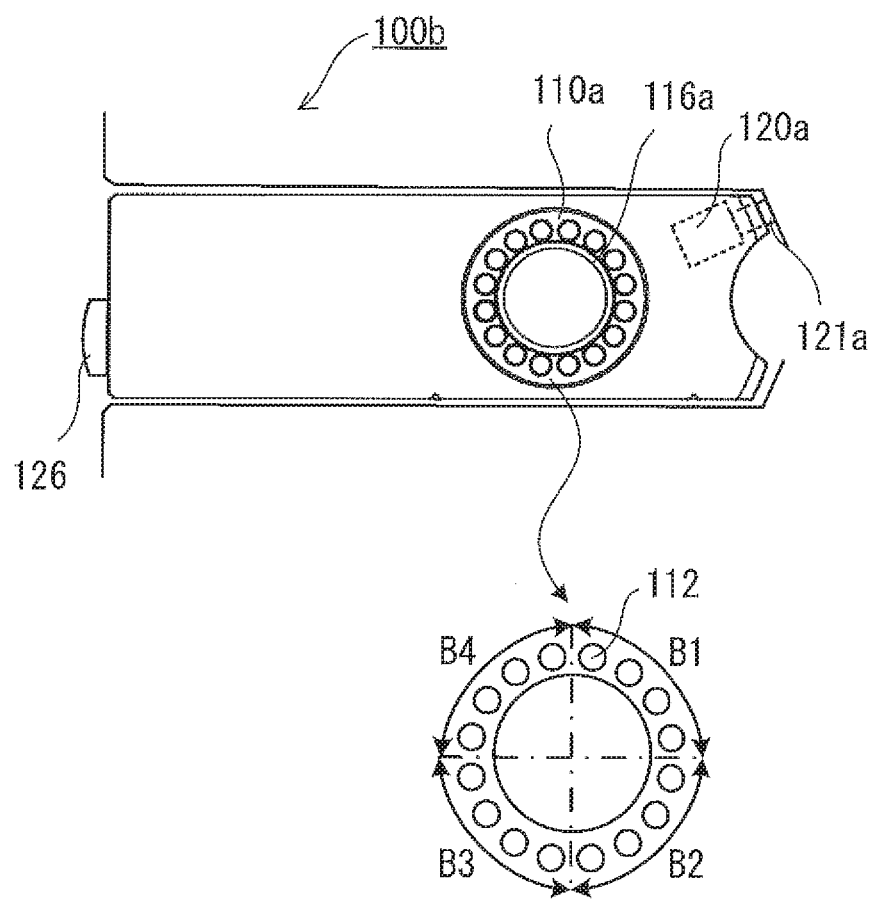
FIG. 4 illustrates a slider in a second example of the first embodiment viewed from a sample side when the slider has been mounted onto a revolver.
Figure 5:
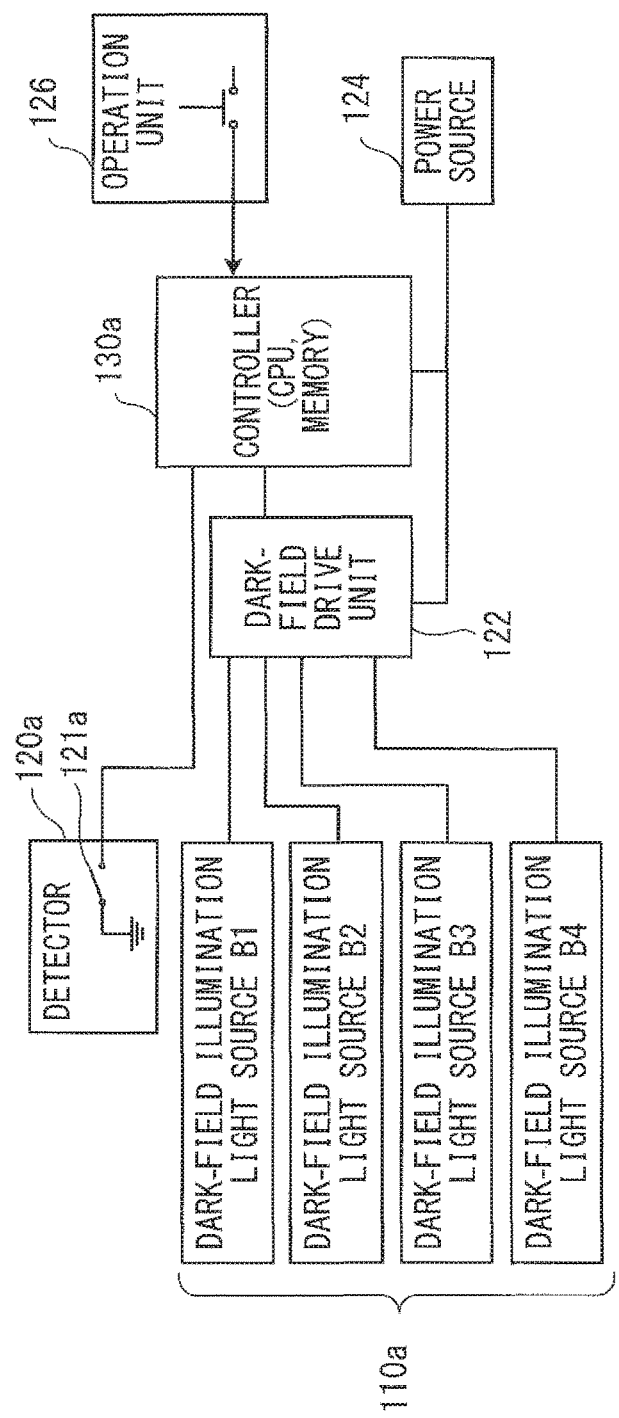
FIG. 5 is a control block diagram in the second example of the first embodiment.

FIGS. 4 and 5 are diagrams explaining a second example of the first embodiment. The plural dark-field illumination light sources 112 are divided into a plurality of blocks in a circumferential direction, and a slider 100b in the second example can perform control to turn on or off the plurality of blocks in block units. The slider 100b in the second example can perform dark-field illumination from a specific direction by driving a specific block. Namely, the slider 100b can realize oblique illumination. The slider 100b in the second example may control a direction or an optical intensity of oblique illumination by turning on the plurality of blocks.

FIG. 4 illustrates the slider 100b in the second example viewed from the side of the sample 90 when the slider 100b has been mounted onto the revolver 40. The slider 100b includes an operation unit 126 at a rear end that is located opposite to a front end. The dark-field illumination light sources 112 are divided into a plurality of blocks in a circumferential direction, and are controlled in accordance with an operation of the operation unit 126. In this example, sixteen dark-field illumination light sources 112 are provided, and the sixteen dark-field illumination light sources 112 are divided into four blocks (B1, B2, B3, and B4) each including four dark-field illumination light sources 112, and are controlled.

FIG. 5 is a control block diagram of the dark-field illumination unit 110a. The slider 100b includes a detector 120a, a dark-field drive unit 122, a power source 124, an operation unit 126, and a controller 130a. The detector 120a, the dark-field drive unit 122, and the power source 124 respectively have substantially the same functions as those in FIG. 3, and the description thereof is omitted.

The controller 130a includes a CPU and a memory, and the controller 130a reads a control program stored in the memory, and makes the CPU perform a control process. The detector 120a and the operation unit 126 are connected to the controller 130a, and signals from the detector 120a and the operation unit 126 are reported to the controller 130a. By using the operation unit 126, a user instructs turning on or off of the entirety of the dark-field illumination unit 110a, or blocks to be illuminated.

The controller 130a determines that the slider 100b has been inserted into or removed from the slider mounting unit 42 on the basis of an output from the detector 120a that corresponds to the movement of the movable piece 121a, and controls the dark-field drive unit 122 to drive (turn on or off) the dark-field illumination light sources 112. When the slider 100b is drawn from a prescribed position of the slider mounting unit 42, the controller 130a controls the dark-field drive unit 122 to immediately turn off the dark-field illumination light sources 112.

In addition, the controller 130a detects an operation of the operation unit 126, and controls the dark-field drive unit 122 to selectively turn on the blocks B1 to B4 in accordance with the operation. As an example, the controller 130a may perform control to sequentially switch full turn-on, turn-on of B1, turn-on of B2, turn-on of B3, turn-on of B4, and full turn-off in accordance with a push operation performed on the operation unit 126.

In the description above, the movable piece 121a is projecting from the slider 100b. Conversely, a convex portion may be provided in the slider mounting unit 42, the movable piece 121a may be formed so as to be recessed toward the inside of the slider 110b, and the detector 120a may detect the convex portion of the slider mounting unit 42 by using the movable piece 121a, when the slider 110b has been mounted. This can prevent a situation in which, when the slider 100b is not mounted, a finger or the like comes into contact with the movable piece 121a, and the dark-field illumination light sources 112 are uselessly turned on.

The detector 120*a*, which detects insertion or removal of the slider, may be non-contact type. The detector 120*a* may perform magnetic force detection using a Hall sensor, reflected light detection using a photointerrupter, or brightness detection using a photodiode. Further, the movable piece 121*a* does not always need to be located at the end of the slider, and the movable piece 121*a* may be located on the side or the bottom of the slider.

Figure 6:
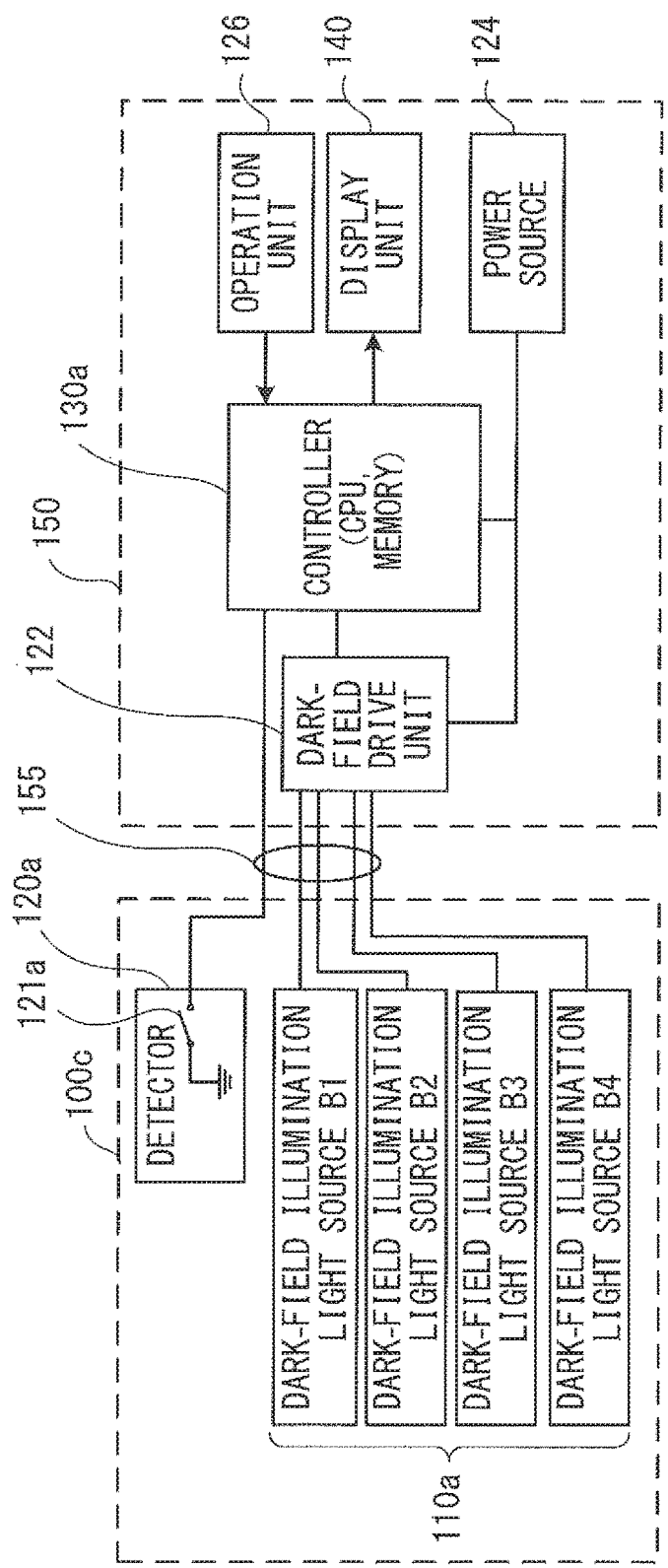
FIG. 6 is a control block diagram in a third example of the first embodiment.

FIG. 6 is a control block diagram in a third example of the first embodiment. A slider in the third example is referred to as a slider 100*c*. In the third example, a dark-field illumination apparatus is configured of the slider 100*c* and a slider controller 150. The size of a slider is limited, and therefore the slider controller 150 is provided separately from a slider body, and some members are moved within the slider controller 150. An outline view of the slider 100*c* is similar to that of the slider 100*a* in FIG. 2, and therefore the slider 100*c* is not illustrated. In this example, the dark-field drive unit 122, the power source 124, the operation unit 126, the controller 130*a*, and the like are provided in the slider controller 150 separately from the slider 100*c*. The same members as those in FIG. 5 are denoted by the same reference numerals, and the description thereof is omitted.

A dark-field illumination unit 110*a* and a detector 120*a* are provided in the slider 100*c*. A dark-field drive unit 122, a power source 124, an operation unit 126, a controller 130*a*, a display unit 140, and the like are incorporated into the slider controller 150 separated from the slider 100*c*. The slider controller 150 and the slider 100*c* are connected via a cable 155.

The display unit 140 displays mounting of the slider 100*c* or a state of dark-field illumination, and displays, for example, which block is being turned on (driven). The display unit 140 is, for example, a small LCD. The slider controller 150 has smaller restrictions on size than the slider 100*c*, and the display unit 140 is easily arranged in the slider controller 150. The display unit 140 may display errors, may report a state of insertion or removal of the slider 100*c*, may display an illumination state such as which light source of a bright-field illumination light source and a dark-field illumination light source is in a turn-on state, or may display a light control state.

The operation unit 126 is an input unit that instructs switching of the dark-field illumination. The operation unit 126 may be a touch panel integrated with the display unit 140. In accordance with an operation performed using the operation unit 126, the controller 130*a* controls the dark-field drive unit 122 to turn on one of the blocks B1-B4, a combination of plural blocks, or all of the blocks. An AC/DC converter may be provided instead of the power source 124 so as to input the AC.

Figure 7:
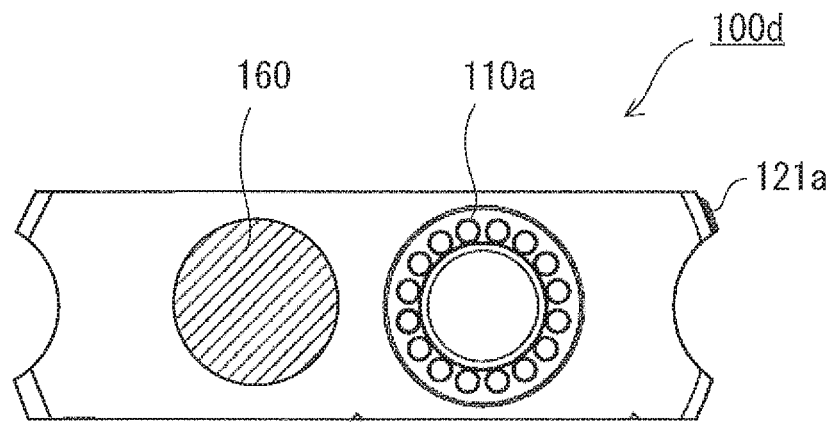
FIG. 7 is an outline view of a variation of a slider according to the first embodiment.

FIG. 7 is an outline view of a variation of a slider. A slider 100*d* in FIG. 7 is mounted with both a differential interference element 160 and a dark-field illumination unit 110*a*. The appearance of the slider 100*d* is formed substantially bilaterally symmetrical, and by changing a direction in which the slider 100*d* is mounted, the differential interference element 160 or the dark-field illumination unit 110*a* can be selected. By using the slider 100*d*, the differential interference element 160 or the dark-field illumination unit 110*a* can be selected, and a plurality of sliders does not need to be prepared. For a control system, a system incorporating a power source, as illustrated in FIG. 3 or 5, or a system that provides a current by using a contact, as illustrated in FIG. 8, may be employed.

FIGS. 8A to 8D are diagrams explaining a fourth example of the first embodiment. In the fourth example, a detector 120*b*, a dark-field drive unit 122, a power source 124, a controller 130, and the like are provided on the side of the slider mounting unit 42, namely, in the revolver 40 or the body unit 12.

Figure 8A:
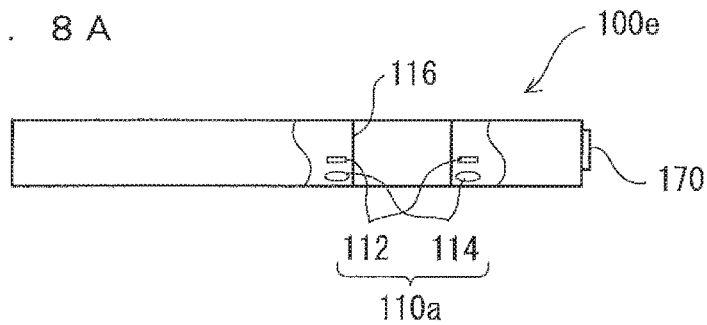
FIG. 8A is a sectional view of a slider in a fourth example of the first embodiment.

FIG. 8A is a sectional view of a slider 100*e* in the fourth example illustrating a plane including an observation optical axis L. FIG. 8A is a diagram viewed from a direction similar to the direction in FIG. 1, and illustrates a cross section of the dark-field illumination unit 110*a*. At the right-hand end of the slider 100*e*, a convex unit 170 is formed. The convex unit 170 enables the revolver 40 to detect mounting of the slider 100*e* instead of the movable piece 121*a*. In the slider 100*e*, the dark-field illumination unit 110*a* is provided.

Figure 8B:
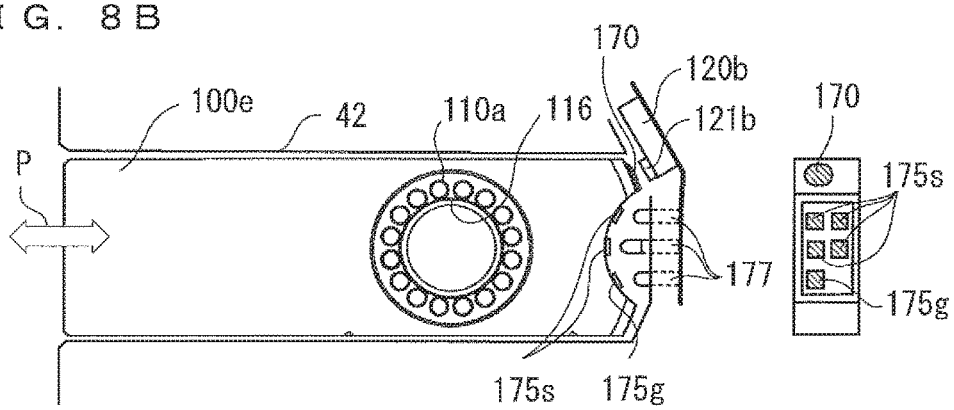
FIG. 8B illustrates a state immediately before a slider is mounted in the fourth example of the first embodiment.

FIG. 8B illustrates the slider 100*e* viewed from the side of the sample 90 when the slider 100*e* has been mounted onto the revolver 40, and illustrates a state immediately before the slider 100*e* is mounted onto the revolver 40. FIG. 8B is a view from the same direction as the direction in FIG. 2B. At the end of the slider 100*e* in a direction in which the slider 100*e* is mounted (a rightward direction of the arrow P), electrical contacts (contacts 175*s* and 175*g*) for inputting a driving current supplied from the revolver 40 are provided. A diagram on the right-hand side of FIG. 8B is a right-hand side view, and is a diagram explaining the arrangement of the electrical contacts.

The contact 175*s* is a contact that supplies a current from the revolver 40 to the dark-field illumination light sources 112, and contacts 175*s* of the several blocks are provided in order to turn on or off the dark-field illumination light sources 112 in block units. Assume, for example, that the dark-field illumination unit 110*a* is divided into four blocks B1-B4, as illustrated in FIG. 8D, and that the four blocks are individually driven. There are four blocks, B1-B4, and therefore four contacts 175*s* are provided. Each of the four contacts 175*s* is connected to the respective dark-field illumination light sources 112 in a corresponding block within the slider 100*e*. The contact 175*g* is a common ground.

The detector 120*b* detects mounting of the slider 100*e* onto the slider mounting unit 42, and is provided in the revolver 40. A movable piece 121*b* of the detector 120*b* is pressed by the moved convex unit 170, and a switch is turned on within the detector 120*b*.

A power source supplying a current to the slider 100*e* is provided in the revolver 40, and the current is supplied at a contact between the revolver 40 and the slider 100*e*, and this prevents the slider 100*e* from being turned on when the slider 100*e* is not mounted onto the slider mounting unit 42.

In addition, in the slider mounting unit 42 of the revolver 40, a corresponding number (in this example, five) of movable contacts 177 are provided in a position in contact with the contacts 175*s* and the contact 175*g* of the slider 100*e*. Each of the movable contacts 177 is a conductive pin that is incorporated with a spring so as to be movable by a prescribed distance in a P direction. The movable contact 177 may be a flat spring.

Figure 8C:
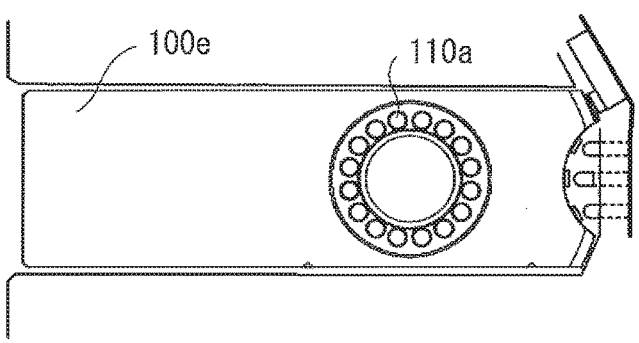
FIG. 8C illustrates a state in which a slider has been mounted in the fourth example of the first embodiment.
Figure 8D:
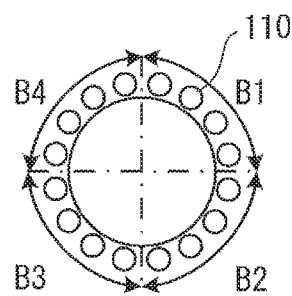
FIG. 8D is a diagram explaining blocks of a dark-field illumination unit in the fourth example of the first embodiment.

FIG. 8C illustrates a state in which the slider 100*e* has been moved further in a rightward direction from the state illustrated in FIG. 8B so as to be completely mounted onto the slider mounting unit 42.

FIG. 9 is a control block diagram in the fourth example. The same members as those in FIGS. 5, 6 and the like are denoted by the same reference numerals, and the description thereof is omitted. In an illumination apparatus 20, a light source 22, a detector 120*b*, a dark-field drive unit 122, a controller 130*b*, and the like are provided. Further, an operation unit 126, a display unit 140, a light source drive unit 142, and the like are provided, for example, in a body unit 12.

The controller 130b is a controller that integrally controls the entirety of the microscope apparatus 1. The controller 130b includes a CPU and a memory, and reads a control program stored in the memory so as to make the CPU perform a control process. The light source drive unit 142 is a drive unit that drives (turns on or off) the light source 22. The controller 130b is connected to the detector 120b, the dark-field drive unit 122, the operation unit 126, the display unit 140, and the light source drive unit 142.

When the slider 100e is not mounted, the controller 130b controls the light source drive unit 142 to turn on the light source 22.

When the detector 120b detects mounting of the slider 100e, the controller 130b controls the dark-field drive unit 122 to turn on the dark-field illumination unit 110a. Alternatively, the controller 130b may make the display unit 140 display that dark-field illumination is available, and may control the dark-field drive unit 122 in accordance with an instruction from the operation unit 126.

The dark-field drive unit 122 energizes the movable contact 177 that corresponds to an instructed block of the dark-field illumination unit 110a under the control of the controller 130b. A current flows to the dark-field illumination light sources 112 in a prescribed block via the contact 175s in contact with the movable contact 177, and the dark-field illumination light sources 112 are turned on. In the description above, contacts of the several blocks are provided; however, a contact for a power supply and a contact for a control signal may be provided, and each of the blocks may be controlled to be turned on in accordance with the control signal.

The controller 130b may control the light source 22 to be turned off when the slider 100e is mounted. The controller 130b may control the light source 22 to be turned on simultaneously with the dark-field illumination light sources 112 in accordance with the instruction from the operation unit 126.

As described above, the microscope illumination apparatus according to the first embodiment includes light sources arranged in a ring shape, and also includes a dark-field illumination unit that is removably provided in an observation light path of a microscope, a detector that detects that the dark-field illumination unit has been arranged in or has deviated from the observation light path, and a controller that controls the light sources to be turned on or off in accordance with detection of the detector.

In the first embodiment described above, the dark-field illumination light sources 112 may be configured of elements of plural colors (for example, red, green, blue, ultraviolet, and the like), and the controller 130a (or 130b) may perform control to select luminescent color in accordance with an operation of the operation unit 126. The controller 130a (or 130b) may also control blocks to be turned on sequentially in a circumferential direction in accordance with an instruction. Namely, the controller 130a (or 130b) may perform control to turn on the blocks in the order of B1, B2, B3, B4, and B1. The controller 130a (or 130b) may perform control to turn on the blocks in an arbitrary specified order. The controller 130a (or 130b) may control each of the blocks to emit light of a different color. In the description above, the dark-field illumination light sources 112 are divided into blocks in the circumferential direction; however, the dark-field illumination light sources 112 may be divided into blocks in a direction of a radius vector.

In the first embodiment, the dark-field illumination unit 110a is provided in a removable slider, and therefore a microscope apparatus can handle dark-field illumination without greatly changing an entire configuration of the microscope apparatus. By providing a controller of dark-field illumination and the like in a external device (the slider controller 150) or a microscope body, switching of dark-field illumination and a display of a state can be easily performed, and usability is improved.

According to the slider 100a in the first example or the slider 100b in the second example, when the slider 100a or the slider 100b is drawn out, the controller 130a performs control to turn off the dark-field illumination light sources 112, and this prevents illumination of the dark-field illumination light sources 112 from directly entering into an observation light path of the objective 50 while the slider 100a or the slider 100b is being drawn out (an antiglare effect). When illumination of the dark-field illumination light sources 112 directly enters into the observation light path of the objective 50 while the slider 100a or the slider 100b is being drawn out, as an example, a great change in a light quantity is generated in a case in which monitor observation is performed using an image sensor. As another example, in a case in which dark-field observation is performed using an eyepiece, an observer who is used to the dark-field observation senses the glare.

Second Embodiment

Figure 10:
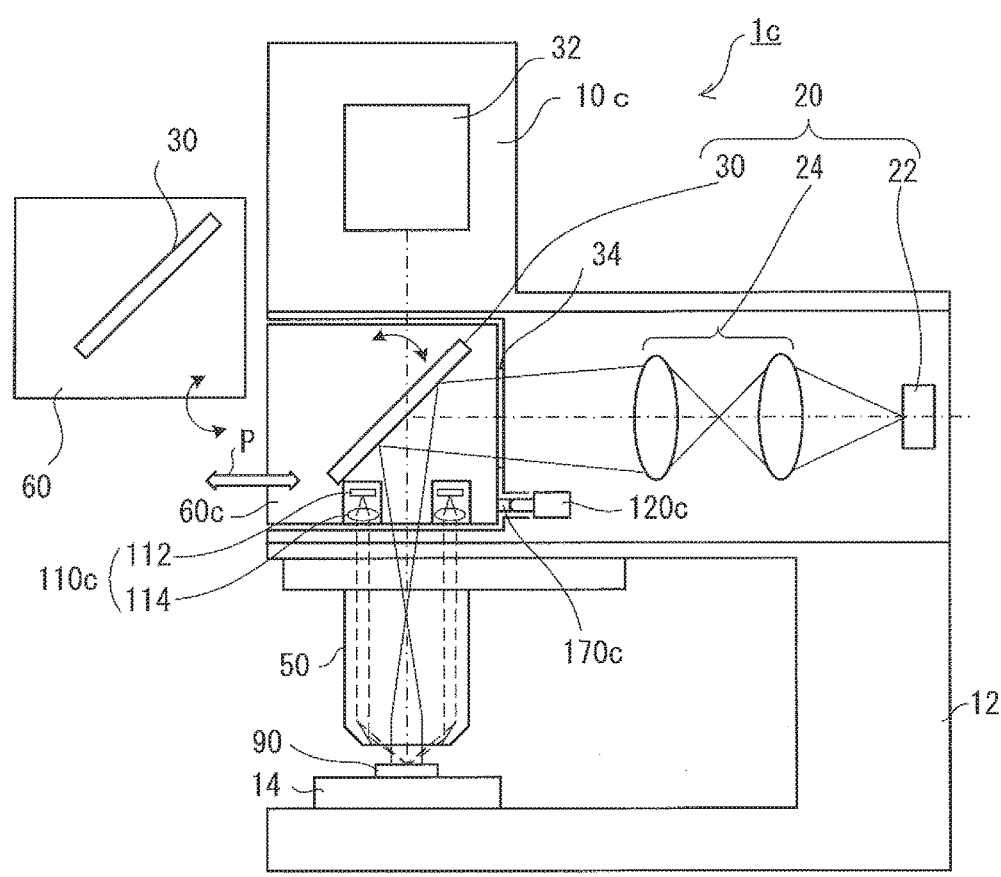
FIG. 10 illustrates an entire configuration of a microscope apparatus according to a second embodiment.

In a second embodiment, a dark-field illumination unit 110c is provided in an optical path return unit. FIG. 10 illustrates an entire configuration of a microscope apparatus 1c mounted with a microscope illumination apparatus according to the second embodiment.

An optical path return unit 60 is also referred to as a mirror unit, and is a unit including a half mirror 30. An illumination apparatus 20 is configured in such a way that a normal optical path return unit 60 and an optical path return unit 60c provided with the dark-field illumination unit 110c can be freely mounted.

FIG. 10 illustrates a state in which the optical path return unit 60c provided with the dark-field illumination unit 110c has been mounted onto the illumination apparatus 20. The same members as those in FIG. 1 are denoted by the same reference numerals, and the description thereof is omitted. The optical path return unit 60c is configured in such a way that the half mirror is rotatable so as to be retracted from an observation light path in dark-field observation. In the state illustrated in FIG. 10, observation while simultaneously performing dark-field illumination and bright-field illumination is dealt with. A unit dedicated to dark-field observation may be configured to include only the dark-field illumination unit 110c without the half mirror 30.

Similarly to the first embodiment, the dark-field illumination unit 110c is configured in such a way that plural sets of a dark-field illumination light source 112 and a collimator lens 114 are arranged in a ring shape. As illustrated in FIG. 10, a convex unit 170c for detection of mounting is provided at a right-hand end of the optical path return unit 60c. In the normal optical path return unit 60, the convex unit 170c for detection of mounting is not provided. In the illumination apparatus 20, a detector 120c that detects the convex unit 170c is provided.

FIG. 11 is a trihedral figure illustrating a configuration of the optical path return unit 60c. An upper-left diagram illustrates the optical path return unit 60c viewed from the same direction as in FIG. 10, an upper-right diagram is a right-hand side view of the optical path return unit 60c illustrated in the upper-left diagram, and a lower-left diagram illustrates the optical path return unit 60c viewed from the side of the sample 90.

In FIG. 11, an illumination aperture 34 that transmits bright-field illumination is formed on a right-hand side surface of the optical path return unit 60c, and a convex unit 170c, contacts 175s, and a contact 175g are provided in a lower portion of the illumination aperture 34. The contacts 175s and the contact 175g are in contact with contacts (not illustrated) that are correspondingly provided on the side of the illumination apparatus 20. Via the contacts 175s and the contact 175g, power is supplied from the illumination apparatus 20 to the dark-field illumination unit 110c of the optical path return unit 60c. The number of the provided contacts 175s corresponds to the number of blocks into which the dark-field illumination unit 110c is divided and that are individually turned on.

As illustrated in the diagram viewed from the side of the sample 90, the dark-field illumination unit 110c may be controlled while being divided into blocks B1-B4 in a circumferential direction, similarly to the description with reference to FIG. 4. Dark-field illumination light emitted from the dark-field illumination unit 110c passes through an outer periphery of an observation light path of an objective 50, and is applied to the sample 90.

Similarly to the description with reference to FIG. 9, a dark-field drive unit 122, a controller 130c, a detector 120c, and a light source 22 are provided in the illumination apparatus 20. A control block diagram according to the second embodiment is omitted because the control block diagram according to the second embodiment is similar to the control block diagram illustrated in FIG. 9.

When the normal optical path return unit 60 is removed and the optical path return unit 60c is mounted onto the illumination apparatus 20, the convex unit 170c comes in contact with the detector 120c. The controller 130c detects from an output from the detector 120c that the optical path return unit 60c provided with the dark-field illumination unit 110c has been mounted, and controls the dark-field drive unit 122 to turn on the dark-field illumination light sources 112. The controller 130c also detects that the optical path return unit 60c has been removed, and controls the dark-field drive unit 122 to turn off the dark-field illumination light sources 112. This allows the controller 130c to switch energization to the dark-field illumination unit 110c from an ON state to an OFF state in accordance with the removal of the optical path return unit 60c so as to realize an antiglare effect. Alternatively, the controller 130c may perform control to turn on all of the dark-field illumination light sources 112 or to turn on the dark-field illumination light sources 112 in block units in accordance with the instruction of the operation unit 126.

In the description above, the detector 120c, the controller 130c, the dark-field drive unit 122, and the like are provided in the illumination apparatus 20; however, the detector 120c, the controller 130c, and the like may be provided in the optical path return unit 60c.

As described in the first embodiment, the dark-field illumination light sources 112 may be configured of elements of plural colors (for example, red, green, blue, ultraviolet, and the like), and the controller 130c may perform control to select luminescent color in addition to oblique illumination in accordance with an operation of the operation unit 126. The controller 130c may also control blocks to be turned on sequentially in a circumferential direction in accordance with an instruction. The controller 130c may control blocks to be turned on in an arbitrary specified order. Further, the controller 130c may control the display unit 140 to display a state of dark-field illumination.

As described above, according to the second embodiment, an optical path return unit can be freely removed, and the dark-field illumination unit 110c is provided in the optical path return unit, and therefore dark-field illumination can be dealt with without a great change in the entire configuration of a microscope apparatus.

Third Embodiment

Figure 12:
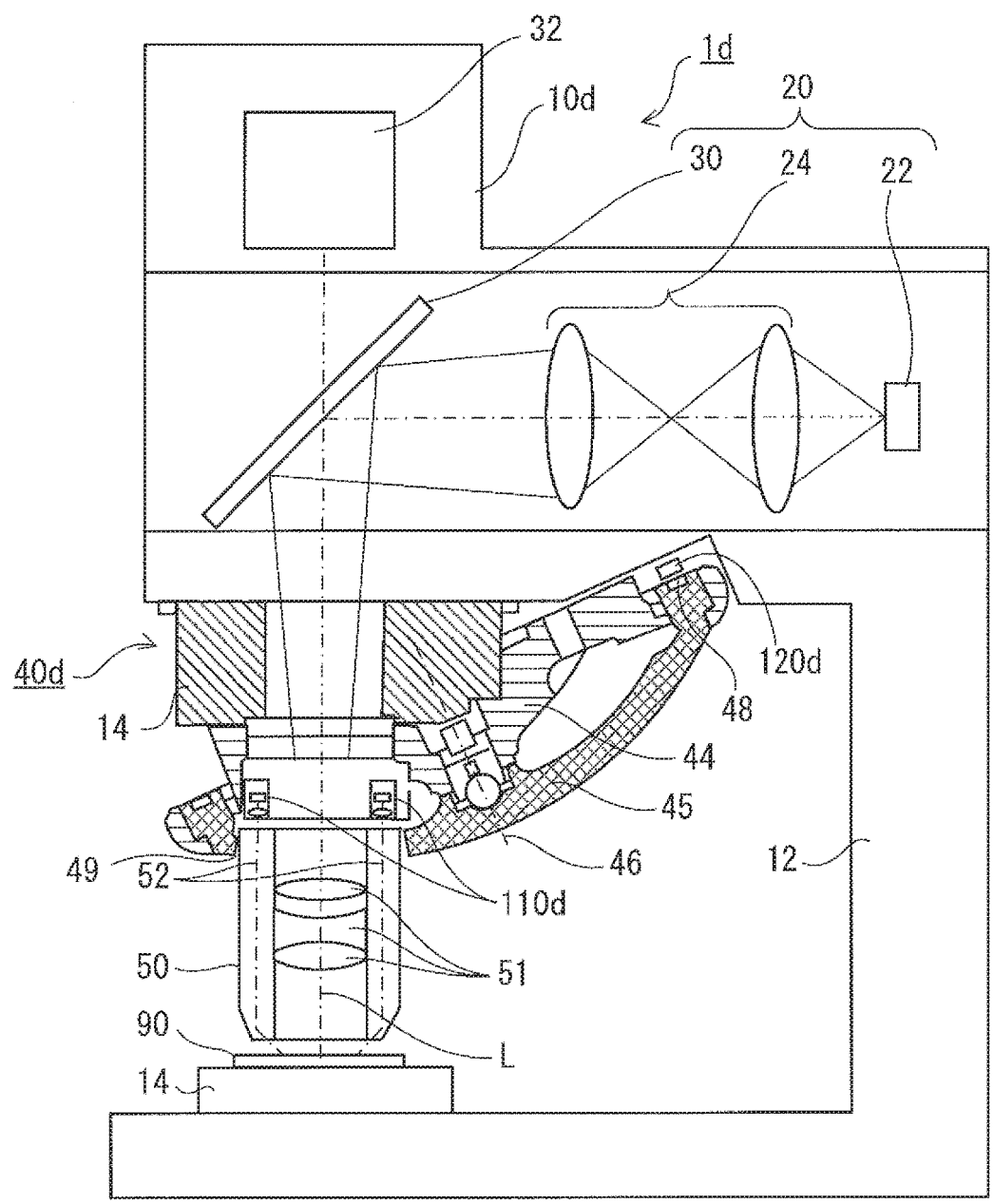
FIG. 12 illustrates an entire configuration of a microscope apparatus according to a third embodiment.

In a third embodiment, a dark-field illumination unit 110d is provided in a revolver that switches objectives. FIG. 12 illustrates a configuration of a microscope apparatus 1d mounted with a microscope illumination apparatus according to the third embodiment. The same members as those in FIG. 1 are denoted by the same reference numerals, and the description thereof is omitted.

A revolver 40d includes a fixed unit 44, a movable unit 45, and a rotary shaft 46 that rotates the movable unit 45 with respect to the fixed unit 44. In the movable unit 45, a plurality of mounting units 49 in which a female screw is formed in order to mount the objective 50 are provided. The objective 50 includes lenses 51 in the center, and a dark-field illumination light path 52 is provided outside the lenses 51.

Dark-field illumination units 110d are respectively provided in the mounting units 49 of the movable unit 45. The respective dark-field illumination units 110d are arranged in a position nearly right above the objective 50 within the respective mounting units 49.

In an outer periphery of the movable unit 45, a detected element 48 is provided in order to detect a rotation position of the revolver 40d. A detector 120d that detects the detected element 48 is correspondingly fixed to a body unit 12.

The detected element 48 and the detector 120d may respectively be any detected elements and detectors that enable non-contact detection. An example in which the detected element 48 is a magnet and the detector 120d is a Hall element sensor is described below. The detected element 48 may be a reflector, and the detector 120d may be a photo sensor.

The detector 120d is connected to a controller 130d provided in the body unit 12. The controller 130d determines the rotation position of the revolver 40d on the basis of a signal from the detector 120d.

Figure 13:
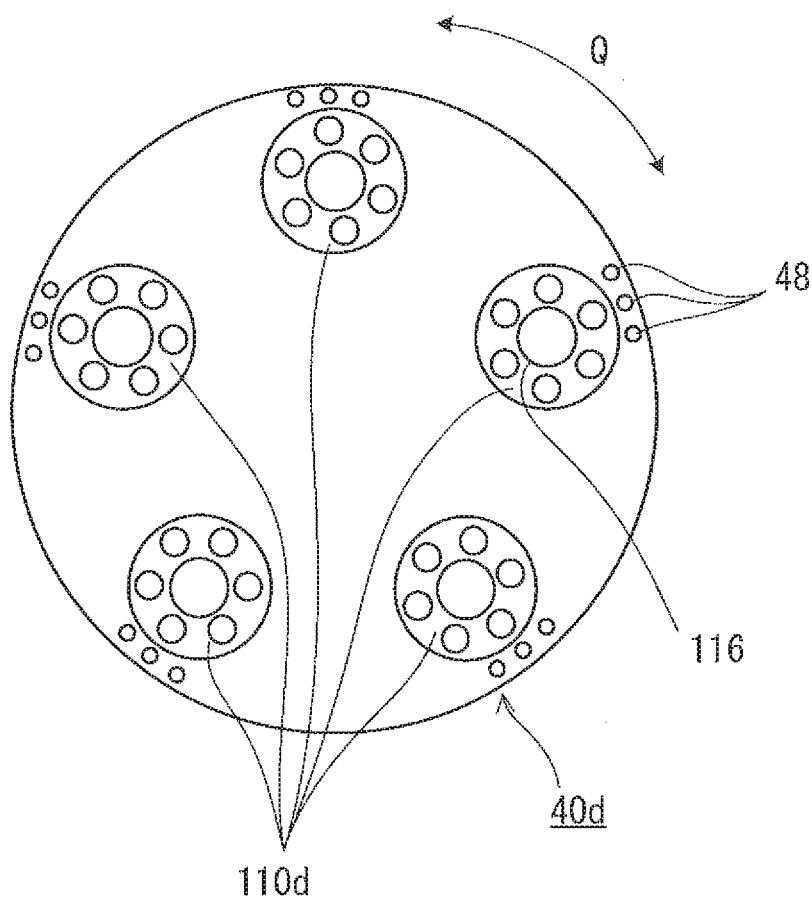
FIG. 13 illustrates a revolver according to the third embodiment viewed from a sample side of a rotary shaft.

FIG. 13 illustrates the revolver 40d viewed from a sample side of the rotary shaft 46. The revolver 40d rotates in a Q direction. The revolver 40d illustrated in FIG. 13 is an example in which five mounting units 49 are provided. In the revolver 40d, the dark-field illumination units 110d are respectively provided in the five mounting units 49. Here, an example is given in which six dark-field illumination light sources 112 are provided in each of the dark-field illumination units 110d.

Further, the detected elements 48 are provided outside each of the mounting units 49 of the revolver 40d. The detected element 48 is formed of a set of three magnets, and different combination patterns ($2^3=8$ patterns) according to the rotation position can be generated by varying a combination of polarities (N-pole and S-pole) of the three magnets in each of the five mounting units 49. The detected elements 48 are arranged in a position invisible from the sample side, but in FIG. 13, the detected elements 48 are illustrated in positions that respectively correspond to the positions of the mounting units 49 within the revolver 40d viewed from the sample side, in order to explain a relationship with the mounting units 49.

Figure 14:
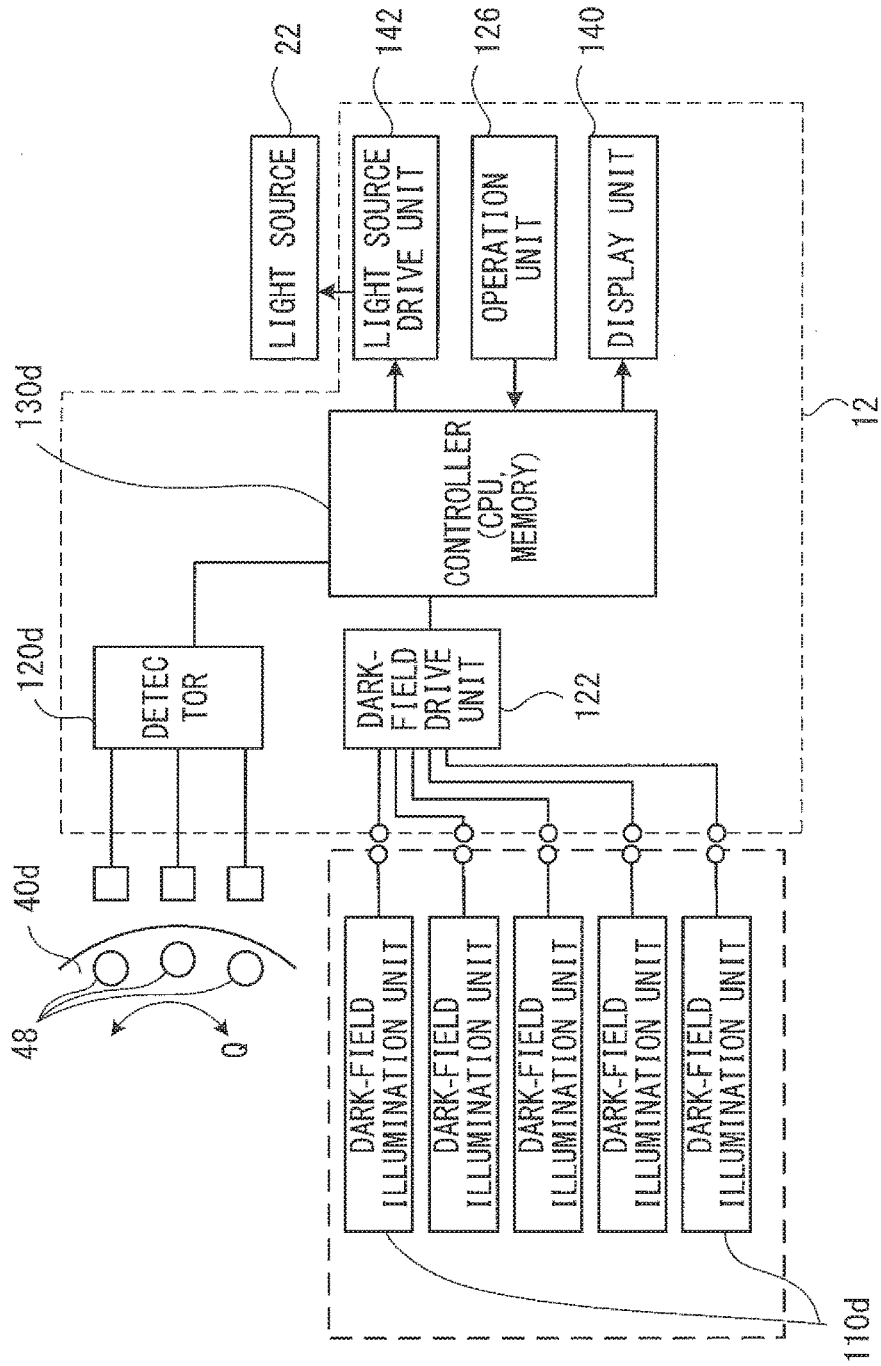
FIG. 14 is a control block diagram according to the third embodiment.

FIG. 14 is a control block diagram according to the third embodiment. The body unit 12 includes a light source drive unit 142, the detector 120d, the controller 130d, a dark-field drive unit 122, a display unit 140, an operation unit 126, and the like. The same members as those in FIG. 9 are denoted by the same reference numerals, and the description thereof is omitted.

The detector 120d including the Hall element sensor detects a polarity pattern of the three magnets of the revolver 40d, and reports the polarity pattern to the controller 130d. The controller 130d references a table prepared in advance, and detects a current position of the revolver 40d on the basis of the detected polarity pattern. The controller 130d then determines which dark-field illumination unit 110d of the five dark-field illumination units 110d is located in a position that corresponds to the observation light path.

The controller 130d controls the dark-field drive unit 122 in accordance with an operation of the operation unit 126 so as to turn on the dark-field illumination unit 110d that corresponds to the observation light path. This avoids useless energization to the other four dark-field illumination units 110d that do not correspond to the observation light path. Energization from the fixed unit 44 to the movable unit 45 may be performed by using, for example, a slip ring (not illustrated).

In a case in which a means for detecting a magnification of the objective 50 mounted onto the revolver 40d is provided, the controller 130d may control a light quantity to a corresponding dark-field illumination light source 112 and the light source 22 in accordance with the magnification of the detected objective 50.

In a microscope in which the revolver 40d is manually rotated, when the controller 130d detects the rotation of the revolver 40d on the basis of the output of the detector 120d, the controller 130d may switch energization to the dark-field illumination unit 110d from an ON state to an OFF state so as to realize an antiglare effect.

Further, as described in the first embodiment, the dark-field illumination light sources 112 may be configured of elements of plural colors (for example, red, green, blue, ultraviolet, and the like), and the controller 130d may perform control to select luminescent color in accordance with an operation of the operation unit 126. The detector 120d may be provided in the fixed unit 44 instead of a lens barrel 10d. The dark-field illumination unit 110d does not always need to be provided in each of the mounting units 49 of the revolver 40d.

Furthermore, as described in the first embodiment, the dark-field illumination unit 110d of each of the mounting units 49 may be divided into blocks, and the controller 130d may control the blocks to perform oblique illumination or to be turned on sequentially in a circumferential direction. The controller 130d may also control the blocks to be turned on in an arbitrary specified order. Further, the controller 130d may control the display unit 140 to display a state of dark-field illumination.

Fourth Embodiment

Figure 15:
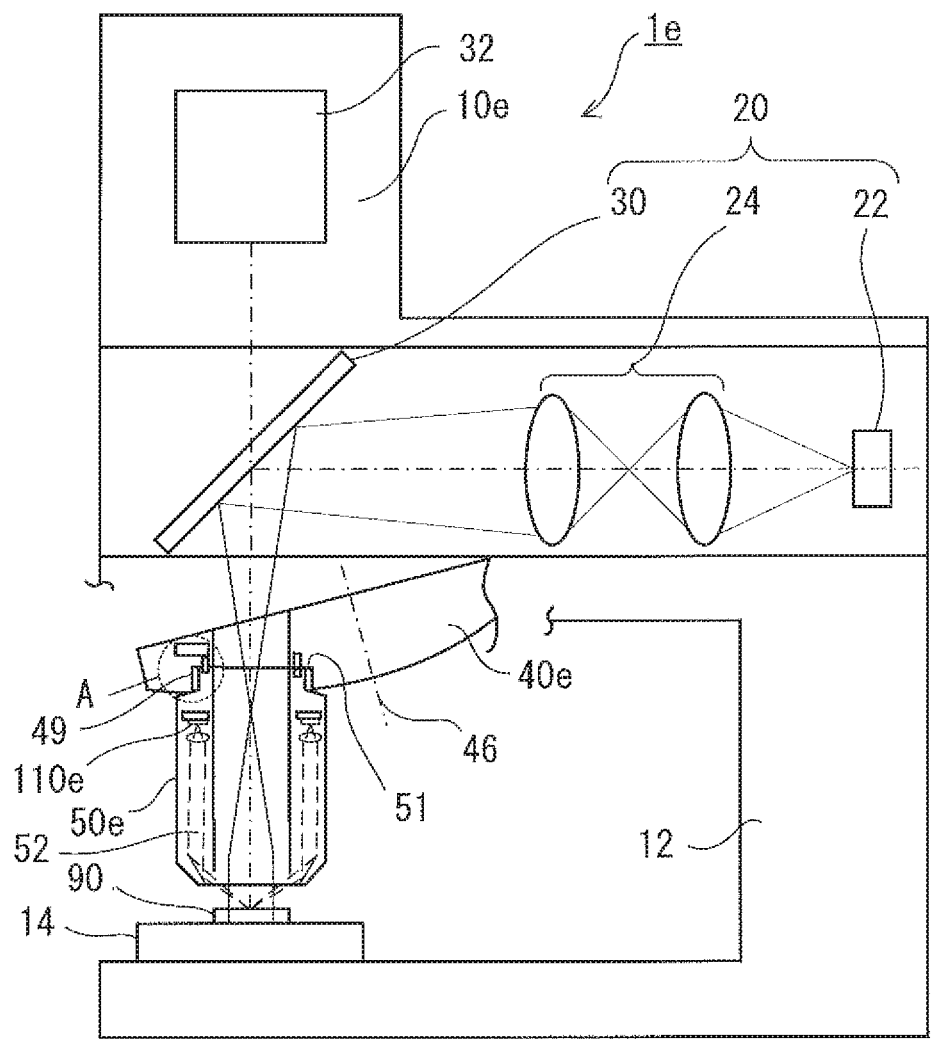
FIG. 15 illustrates a configuration of a microscope apparatus according to a fourth embodiment.

A fourth embodiment is an example in which a dark-field illumination unit is provided within an objective. FIG. 15 illustrates a configuration of a microscope apparatus 1e mounted with a microscope illumination apparatus according to the fourth embodiment. The same members as those in FIG. 1 are denoted by the same reference numerals, and the description thereof is omitted.

An objective 50e includes a dark-field illumination unit 110e. In the objective 50e, the dark-field illumination unit 110e is provided in a position near a mounting unit 49 of a revolver 40e. The dark-field illumination unit 110e is configured of a dark-field illumination light source 112 and a collimator lens 114, and is provided in a ring shape in an outer periphery of the objective 50e. A dark-field illumination light path 52 is formed below the dark-field illumination unit 110e of the objective 50e. Dark-field illumination light emitted from the dark-field illumination light source 112 is converted into almost parallel light by the collimator lens 114, and the almost parallel light passes through the dark-field illumination light path 52, is emitted from the objective 50e, and is applied to a sample 90. A structure similar to the structure described in the first embodiment is employed for a structure of an end on the sample side of the objective 50e.

The dark-field illumination unit 110e is configured of sixteen sets of the dark-field illumination light source 112 and the collimator lens 114 that are arranged at equal intervals, as illustrated in FIG. 4, for example. The dark-field illumination light sources 112 are divided into blocks B1-B4, as illustrated in FIG. 4, and are controlled to be turned on in block units.

A detection mechanism that detects mounting of the objective 50e incorporating the dark-field illumination unit 110e (also referred to as a "dark-field objective 50e") is provided in a portion A on the side of a mounting surface 51 of the objective 50e on the revolver 40e.

Figure 16:
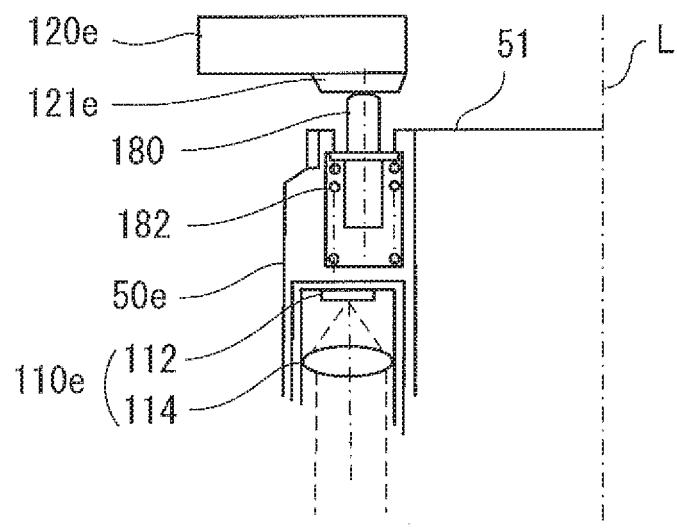
FIG. 16 is an enlarged view of a portion A of a detection mechanism according to the fourth embodiment.

FIG. 16 illustrates the detection mechanism, and is an enlarged view of the portion A in FIG. 15. The detection mechanism is provided above the dark-field illumination unit 110e of the objective 50e. A pin 180 and a spring 182 that biases the pin 180 in a direction of the revolver 40e are provided on the mounting surface 51 of the objective 50e on the revolver 40e.

A detector 120e is provided in each of the mounting units 49 of the revolver 40e for mounting the objective 50e. The detector 120e is, for example, a microswitch. The detector 120e is provided in a position where a movable piece 121e is displaced by the pin 180 of the objective 50e.

Figure 17:
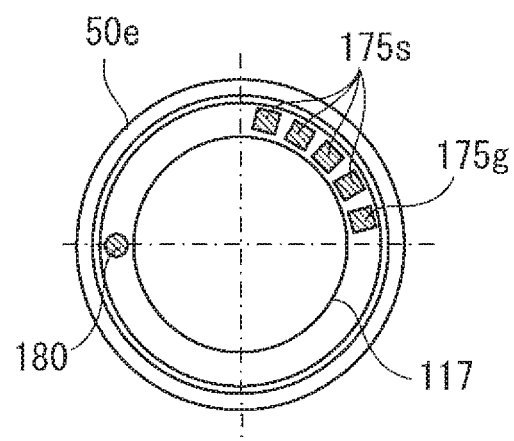
FIG. 17 illustrates an objective according to the fourth embodiment viewed from the side of a mounting surface to a revolver.

FIG. 17 illustrates the objective 50e viewed from the side of the mounting surface 51 on the revolver. In the mounting surface 51 of the objective 50e on the revolver, the pin 180 described with reference to FIG. 16, and contacts 175s and 175g that are used for an electrical contact to provide a current to the dark-field illumination light sources 112, are provided around an aperture 117. The contacts 175 of the several blocks are provided. In this example, four contacts 175s are provided.

Figure 18:
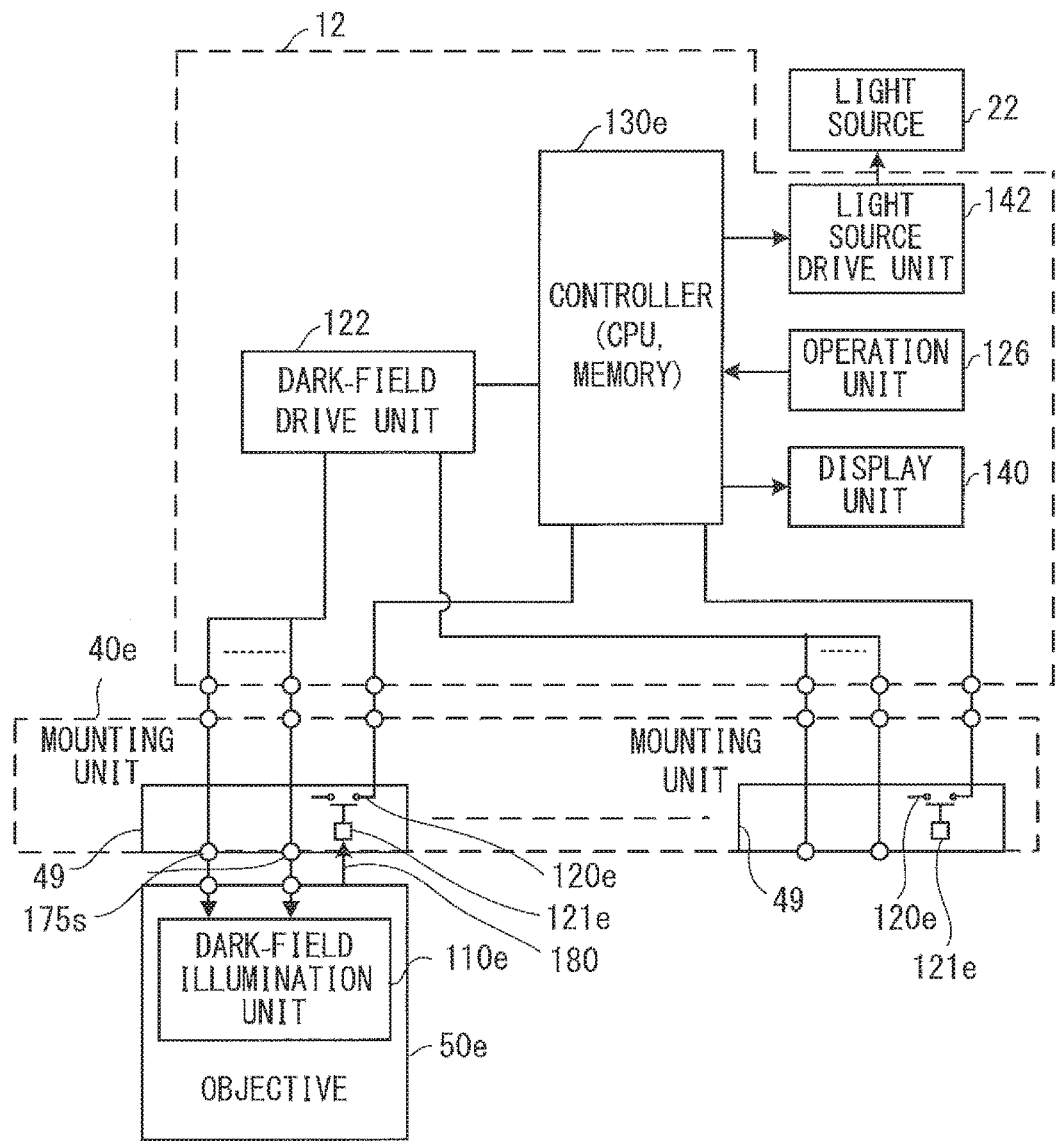
FIG. 18 is a control block diagram according to the fourth embodiment.

FIG. 18 is a control block diagram according to the fourth embodiment. A body unit 12 includes a light source drive unit 142, a controller 130e, a dark-field drive unit 122, an operation unit 126, and the like. The revolver 40e includes the detector 120e, the contacts 175s, and the like. The same members as those in FIG. 9 are denoted by the same reference numerals, and the description thereof is omitted.

An output of the detector 120e that is provided in each of the mounting units 49 of the revolver 40e for mounting the objective 50 is connected to the controller 130e. The pin 180 of the dark-field objective 50e moves the movable piece 121e of the detector 120e so as to connect a switch of the detector 120e. The controller 130e determines which mounting unit 49 of the revolver 40e the dark-field objective 50e has been mounted onto on the basis of the output from each of the detectors 120e.

The controller 130e determines that the revolver 40e has been rotated, and that the dark-field objective 50e has moved in the observation light path, or that the dark-field objective 50e has been mounted onto the mounting unit 49 that corresponds to the observation light path, and controls the dark-field drive unit 122 to turn on the dark-field illumination light sources 112. A lens barrel 10e and the revolver 40e are electrically connected via a slip ring or the like. The controller 130e performs control to turn on all of the dark-field illumination light sources 112 or to turn on the dark-field illumination light sources 112 in block units in accordance with an instruction of the operation unit 126.

Further, as described in the first embodiment, the dark-field illumination light sources 112 may be configured of elements of plural colors (for example, red, green, blue, ultraviolet, and the like), and the controller 130e may perform control to select luminescent color in accordance with an operation of the operation unit 126. Furthermore, the dark-field illumination unit 110e may be divided into blocks, and the controller 130e may control the blocks to perform oblique illumination or to be turned on sequentially in a circumferential direction. The controller 130e may control the block to be turned on in an arbitrary specified order. The controller 130e may control the display unit 140 to display a state of dark-field illumination.

As described above, in the fourth embodiment, dark-field illumination can be selected in accordance with a used objective because a dark-field illumination unit is provided in the objective.

A microscope illumination apparatus according to each of the second to fourth embodiments includes a dark-field illumination unit including light sources that are arranged in a ring shape around an observation optical axis L as a center, the dark-field illumination unit being removably provided in an observation light path of a microscope; a detector that detects that the dark-field illumination unit has been arranged in or deviated from the observation light path; and a controller that controls the light source to be turned on or off in accordance with the detection of the detector.

Other Embodiments

Figure 19:
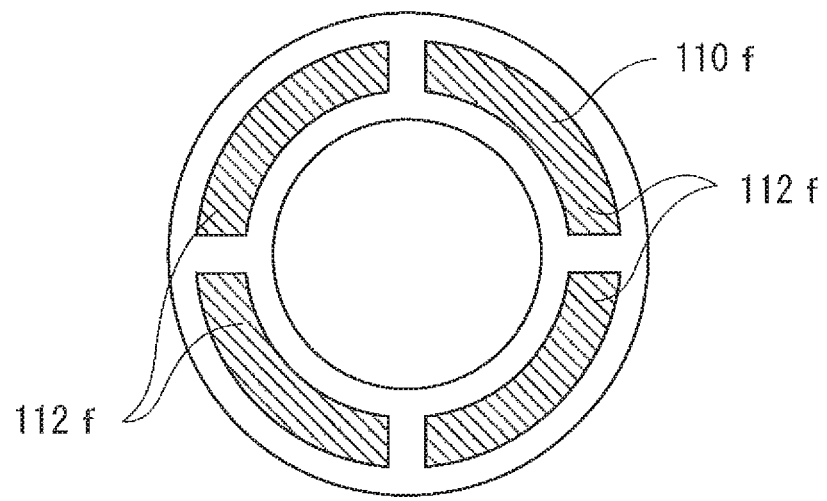
FIG. 19 illustrates another example of a dark-field illumination light source.

FIG. 19 illustrates another example of a dark-field illumination light source 112. The above embodiments have been described by using, as an example, a semiconductor light emitter that performs surface emission, such as an LED, for the dark-field illumination light source 112, but the dark-field illumination light source 112 is not limited to this. FIG. 19 illustrates an example in which an arc-shaped fluorescent tube is used for a dark-field illumination light source 112f. FIG. 19 illustrates a dark-field illumination unit 110f viewed from the side of a sample 90 when the dark-field illumination unit 110f has been mounted onto a revolver 40 and the like. The dark-field illumination unit 110f is configured in such a way that four fluorescent tubes in the shape of an arc of almost 90° are arranged on a circumference.

The dark-field illumination unit 110f using the fluorescent tubes may be incorporated in the slider 100a (100b), as described in the first embodiment, in the return unit 60c, as described in the second embodiment, in the revolver 40d, as described in the third embodiment, or in the objective 50e, as described in the fourth embodiment. The controller 130a or the like may individually control a plurality of fluorescent tubes (in this example, four fluorescent tubes) similarly to the above respective embodiments, in which a dark-field illumination unit is controlled in block units.

The embodiments of the present invention have been described under the assumption of dark-field observation principally using only dark-field illumination, but there is also an observation method in which bright-field illumination and dark-field illumination are simultaneously turned on. As an example, by performing observation using different colors, for example, by using a white light source for bright-field illumination and a red light source for dark-field illumination in vertical illumination, a portion irradiated with red dark-field illumination light can be observed as an edge portion of a sample. Light quantities of bright-field illumination and dark-field illumination may be independently adjusted so as to selectively set an optimum light quantity ratio.

In the case of a microscope system that includes a turret including various mirror units and the like, and a revolver onto which a plurality of objectives can be mounted, and that further includes a detector that can detect which mirror unit and which objective are respectively arranged in an optical path in the turret and the revolver, an alarm sound may be emitted or a warning may be displayed in a display unit when an unexpected combination of the mirror unit and the objective is incorrectly generated.

It is preferable that a warning be displayed, for example, when observation with bright-field illumination and dark-field illumination turned on simultaneously is desired but a mirror unit for fluorescent observation or a mirror unit for coaxial vertical dark-field illumination is arranged.

Examples of the mirror unit include a mirror unit for fluorescent observation, a mirror unit for coaxial vertical dark-field illumination, a mirror unit including a half mirror for simultaneously performing bright-field illumination and dark-field illumination according to the present invention, and the like. Examples of the objective include an objective for performing only bright-field observation, an objective for bright-field observation including a dark-field illumination light path, and the like.

It is also preferable that a light source of bright-field illumination or dark-field illumination be turned off in order to achieve an antiglare effect, when a revolver or a turret is rotated.

Observation with a high resolving power can be performed by using dark-field illumination light having a shorter wavelength. Further, by using an LED or the like that emits ultraviolet radiation for a light source for dark-field illumination in dark-field observation, fluorescent observation can be performed on a sample that is not influenced by intrinsic fluorescence of an objective in an apparatus having a simple configuration, compared with a case in which a common coaxial vertical dark-field illumination apparatus is used.

An LED has been described as a light source, but a semiconductor element, such as an organic EL element, that performs surface emission may be employed, or light may be introduced from an external light source to a slider or the like through an optical fiber. A power source that supplies power is not illustrated in FIGS. 9, 14, and 18, but power is appropriately supplied from an external power source or the like to respective units, although this is omitted in the drawings.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OR NUMERALS 1a, 1c, 1d, 1e Microscope apparatus
10, 10c, 10d, 10e Lens barrel
30 Half mirror
32 Observation unit
34 Illumination aperture
40, 40d, 40e Revolver
44 Fixed unit
45 Movable unit
46 Rotary shaft
48 Detected element
49 Mounting unit
50, 50e Objective
52 Dark-field illumination light path
60, 60c Return unit
100 Slider
110a, 110c, 110d, 110e, 110f Dark-field illumination unit
112 Dark-field illumination light source
114 Collimator lens
120a, 120b, 120c, 120d, 120e Detector
121 Movable piece
122 Light-source drive unit
130a, 130b, 130c, 130d, 130e Controller
140 Display unit
150 Slider controller

What is claimed is:

1. A microscope illumination apparatus for a microscope with a revolver onto which an objective of the microscope is mounted, the revolver including a slider mounting unit, and the microscope illumination apparatus comprising:
   a slider which is insertable into and removable from the revolver via the slider mounting unit;
   a dark-field illumination unit provided in the slider, the dark-field illumination unit including dark-field-illumination light sources that are arranged in a ring, the dark-field illumination unit being configured to be provided at a prescribed position at which an observation optical axis of the microscope coincides with a center of the ring;
   a detector that is configured to detect whether the slider is arranged in or deviated with respect to a prescribed position of the revolver, wherein the detector is configured to output a turn-on signal when it is detected that the slider is arranged in the prescribed position, and the detector is configured to output a turn-off signal when it is detected that the slider is deviated with respect to the prescribed position; and
   a controller that is configured to control the dark-field-observation light sources to be turned on or off in accordance with an output of the detector.

2. The microscope illumination apparatus according to claim 1, wherein the slider includes an optical element for differential interference observation, in addition to the dark-field illumination unit.

3. The microscope illumination apparatus according to claim 1, wherein the dark-field-illumination light sources are each a semiconductor element.

4. The microscope illumination apparatus according to claim 3, wherein the controller is configured to perform control to change colors of the dark-field-illumination light sources.

5. The microscope illumination apparatus according to claim 1, wherein the dark-field-illumination light sources are each a fluorescent tube.

6. The microscope illumination apparatus according to claim 1, wherein the dark-field-illumination light sources are divided into a prescribed number of blocks in a circumferential direction, and the controller is configured to control a direction of oblique illumination by turning on a specified block of the prescribed number of blocks.

7. The microscope illumination apparatus according to claim 6, wherein the controller is configured to control the dark-field-illumination light sources to be turned on in block units.

8. The microscope illumination apparatus according to claim 6, wherein the controller is configured to control the dark-field-illumination light sources to be turned on in block units in an arbitrary order specifying the blocks in the circumferential direction.

9. The microscope illumination apparatus according to claim 1, wherein the controller controls a display to display respective illumination states.

10. A microscope illumination apparatus comprising:
    a dark-field illumination unit including dark-field-illumination light sources that are arranged in a ring, the dark-field illumination unit being configured to be removably provided at a prescribed position at which an observation optical axis of the microscope coincides with a center of the ring;
    a detector that is configured to detect whether the dark-field illumination unit has been arranged in the prescribed position, wherein the detector the detector is configured to output a turn-on signal when it is detected that the dark-field illumination unit has been arranged in the prescribed position, and the detector is configured to output a turn-off signal when it is detected that the dark-field illumination unit is deviated with respect to the prescribed position; and
    a controller that is configured to control the dark-field-observation light sources to be turned on or off in accordance with an output of the detector,
    wherein:
    the dark-field illumination unit is provided within a revolver in at least one mounting unit of a plurality of mounting units for mounting an objective, the plurality of mounting units being provided in the revolver, and
    the detector detects, based on a rotation position of the revolver, whether the at least one mounting unit has been arranged in or deviated with respect to the prescribed position, the at least one mounting unit being provided with the dark-field illumination unit.

11. A microscope illumination apparatus comprising:
    a dark-field illumination unit including dark-field-illumination light sources that are arranged in a ring, the dark-field illumination unit being configured to be removably provided at a prescribed position at which an observation optical axis of the microscope coincides with a center of the ring;
    a detector that is configured to detect whether the dark-field illumination unit has been arranged in the prescribed position, wherein the detector the detector is configured to output a turn-on signal when it is detected that the dark-field illumination unit has been arranged in the prescribed position, and the detector is configured to output a turn-off signal when it is detected that the dark-field illumination unit is deviated with respect to the prescribed position; and a controller that is configured to control the dark-field-observation light sources to be turned on or off in accordance with an output of the detector, wherein:

the dark-field illumination unit is provided in an objective, and the detector detects whether the objective has been mounted onto a prescribed mounting unit of a revolver for mounting the objective.

* * * * *